United States Patent [19]

Dubriske

[11] Patent Number: 5,428,916
[45] Date of Patent: Jul. 4, 1995

[54] WATERPOWERED FISH DECOY AND JIGGING DEVICE

[76] Inventor: Paul C. Dubriske, 454 Elm St., Keene, N.H. 03431

[21] Appl. No.: 123,753

[22] Filed: Sep. 17, 1993

[51] Int. Cl.⁶ .............................................. A01K 91/00
[52] U.S. Cl. .................................... 43/19.2; 43/43.11; 43/26.2
[58] Field of Search ............ 43/26.1, 26.2, 27.4, 43/43.11, 43.13, 19.2

[56] References Cited

U.S. PATENT DOCUMENTS

| | | | |
|---|---|---|---|
| 2,737,748 | 3/1956 | Krozaleski | 43/26.2 |
| 2,789,386 | 4/1957 | Creelman | 43/43.13 |
| 2,813,365 | 11/1957 | Cross | 43/26.2 |
| 3,863,379 | 2/1975 | Kobayashi | 43/19.2 |
| 4,204,356 | 5/1980 | Smith | 43/26.1 |
| 4,509,287 | 4/1985 | Hood | 43/19.2 |
| 4,798,021 | 1/1989 | Miklos | 43/19.2 |
| 4,903,428 | 2/1990 | Sluiter | 43/26.1 |
| 5,185,950 | 2/1993 | Hood | 43/26.1 |

Primary Examiner—P. Austin Bradley
Assistant Examiner—James Miner

[57] ABSTRACT

A fishing device used for trolling is shown which employs the force of water, to engage a propeller that turns a shaft engaging a cluster of gears. The gears alternately engage a worn shaft and a spool. The spool retrieves a cable, to which, is attached a spring loaded parachute that applies a resistive drag to the cable. This parachute incorporates a release mechanism to which a fish line is attached. The cable, while being retrieved on the spool, accelerate the lure attached to the fishline. The worm shaft engages a pawl, which is carried in a pawl retainer, which travels along the worm shafts axis thereby moving the spool, which is rotatably mounted on an axle type shaft mounted parallel to the worm shaft, away from the gear cluster. The spool has a cable attached to it and when the spool is engaged in the gear cluster the cable is wrapped around the spool and when it becomes disengaged the force of the water against the parachute, which is attached to the cable causes the cable to unwind. During the unwinding the fishing lure is suspended motionless and flutters, resembling a stunned baitfish. The device has a housing which is shaped like a fish and incorporates a prominent lateral line, appears to be a feeding predator. This apparent feeding scene as witnessed by other fish triggers the instinct of those fish to feed.

4 Claims, 7 Drawing Sheets

WATERPOWERED FISH DECOY AND JIGGING DEVICE

FIELD OF INVENTION

The present invention is related to trolling while sportfishing and more particularly to a device that is an integral part of creating a fish feeding scene by acting as decoy and imparting a life-like "stunned" fish effect to imitation lures.

BACKGROUND OF INVENTION

Sportfishermen involved in the never ending quest to more closely imitate the natural food of gamefish by imparting a lifelike jigging action to lures have previously attempted to develop underwater jigging devices.

Specifically, previously patented devices include U.S. Pat. Nos. 4,203,356 and 4,903,428. These devices moved lures forward and backward at a speed relatively slower or faster than the boat speed, or the speed of a non "jigging" lure. U.S. Pat. Nos. 4,509,287 and 4,798,021 also changed the speed and also the action of lures. As stated in U.S. Pat. No. 4,509,287, "it is not actually known why fish strike lures as they go through their various actions ... ". These previously developed patented inventions do not apply the recently discovered instincts of fish that cause fish to strike imitation lures.

Being able to imitate feeding fish and their prey and therefore, trigger the instinct of fish to feed is to the anglers advantage.

The need exists for a device to accomplish the duplication of the feeding scene. Although previous attempts to instill life-like action into the feeding scene were headed in the right direction the task remained unaccomplished until the advent of the present invention.

Researchers and biologists have discovered that predatory fish stun their prey prior to feeding. Upon witnessing the fluttering and slowed motion of the prey they begin feeding. Instinct tells them that its the real thing. When one fish feeds, being creatures of schooling habits, they all begin feeding. The stunning of the prey satisfies the fishes instinct to expand the least effort for the most nutritional gain.

Game fish have a lateral line running along each side of their bodies. The present invention has lines that imitate this lateral line. Through this line they are able to produce a sonar like shock wave that will stun baitfish. The lateral line is now often called the strike line or the attack muscle. The present invention embodies these "fishlike" appearances better than anything presently existing.

SUMMARY OF INVENTION

The present invention comprises an underwater water powered device acting as a fish decoy and imparting a life like "stunned effect" to a fishing lure. The device is most frequently towed while trolling but may be used in a current as well. The forward motion through the water or the motion of water passing by activates a propeller thus activating a transmission. The transmission through a serious of spools and gears and shafts retrieves and releases a Jigging cable over various lengths to the anglers satisfaction.

The present invention has numerous enhancing features. It eliminates undependable parts that exists in previous art, is economical to manufacture and consistently performs to expectations.

An example of an undependable part exists in U.S. Pat. No. 4,798,021 where a compression spring part #70 is not used in the capacity it was originally intended for. This may result in premature failure.

A significant improvement this invention has over other "jigging devices" is the parachute type drag. A fishing line may be attached to the jigging cable by any means of release such as a breakable rubber band or one of many fishing releases commercially available. The parachute applies a restive drag to insure a rapid deployment of the jigging cable, thus stopping the lure dead in the water while the device continues to move forward.

Previous art relies on "the force exerted on the line, release and lure" to pull the cable from a reel. Some lures such as artificial flies have very little drag and will not "dump" the cable out.

Another improvement the present invention offers lies in the housing. Simulating a feeding fish with a distinct head, eyes and tail it appears fishlike. An enhanced lateral line collects and reflects light like a feeding fish.

The propeller is mounted completely outside the housing thus allowing it to be changed with a larger or smaller propeller for improved efficiency in a variety of conditions.

Specific enhancements and simplifications the present invention has over prior art in the actual operations of the mechanism are significant. The present invention has the fish line attached directly to the jigging cable release, thus avoiding the cumbersome practice of attaching the fishing line to two releases. U.S. Pat. Nos. 4,903,428 and 4,204,356 rely on a two release system and the chance for a tangle is more likely. Because of the present invention direct attachment to a release and the resistive drag exerted by the force of water on the parachute the fish pole bends and relaxes with each jig. This actual jigging action at the pole improves the anglers concentration and hence success. This action also lets the angler know that his lure is not tangled or that the device is not jammed.

The present invention propeller is attached to a shaft which has a bevel gear attached to the opposite end. This bevel gear meshes with a bevel spool gear and the bevel spur gear. The bevel spool gear is attached a spool around which is wrapped the jigging cable. As the spool turns the cable is retrieved. A retainer is wrapped around the spool preventing the cable from "jumping" off like it will on the prior art. U.S. Pat. Nos. 4,798,021 and 4,509,287 both have open spools or reels and the chance for the line slipping off is much greater. The spool on the present invention turns freely on an axle installed perpendicular to the propeller shaft and vertically in the housing.

The bevel/spur gear also spins freely on the vertical axle and in an opposite direction from the bevel spool gear. This bevel/spur gear turns a spur gear that is mounted to a worm shaft. The worm shaft when turning forces a pawl, in a pawl retainer to travel in a continuous helix groove along its axis. The worm shaft and the vertical axle are parallel in the housing. The pawl retainer comes into contact with the spool forcing it to travel up the axle thus disengaging the bevel spool gear from the bevel gear on the propeller shaft. As the spool is disengaged the force exerted on the jigging cable by the resistive force of the water on the parachute type drag causes it to unwind.

When the pawl retainer travels the length of the continuous helix groove on the wormshaft it reverses its travel thus allowing the spool which is in contact with to return to the propeller bevel gear. A compression spring installed over the axle and in contact with the spool and the top of the housing forces the spool back to the propeller bevel gear and holds it engaged there while the jigging cable is again rewound. This winding and unwinding of the jigging cable on the spool is in direct line with the force of the propeller and the parachute and thus more efficient than prior art. U.S. Pat. No. 4,798,021 requires the cable to wind at right angles to the reel which may cause a bind and will force the cable to pile on one side of the spool. U.S. Pat. No. 4,509,287 has a spool with no means for leveling the cable as it winds on the spool and this could cause a bind.

To best understand these enhancements and the advantages thereof reference to the detailed drawings, the descriptions thereof, and the preferred embodiment of the present invention hereinafter appear.

BRIEF DESCRIPTIONS OF THE DRAWINGS

| DRAWING PART NUMBER REFERENCE | |
|---|---|
| 10 | BOAT |
| 11 | WATER |
| 12 | FISHING ROD |
| 13 | ROD HOLDER |
| 14 | UNDERWATER DEVICE |
| 15 | LURE |
| 16 | FISHING LINE |
| 17 | PARACHUTE TYPE DRAG |
| 18 | DOWNRIGGER |
| 19 | DOWNRIGGER CABLE |
| 19a | DOWNRIGGER WEIGHT |
| 20 | HOUSING |
| 21 | STRIKE LINE |
| 22 | PROPELLER |
| 23 | EYE |
| 24 | TOP STUD |
| 24a | NUT |
| 25 | BOTTOM STUD |
| 26 | RING |
| 27 | CABLE |
| 28 | CAP NUT |
| 29 | SWIVEL |
| 30 | PARACHUTE |
| 31 | STRING |
| 32 | TUBE |
| 33 | COMPRESSION SPRING |

-continued

| DRAWING PART NUMBER REFERENCE | |
|---|---|
| 34 | ROD |
| 35 | RESTRICTED END |
| 36 | RING |
| 40 | PROPELLER SHAFT |
| 41 | BUSHING |
| 42 | BEVEL GEAR |
| 44 | BEVEL GEAR ON SPOOL |
| 46 | BEVEL/PINION GEAR |
| 48 | SPUR GEAR |
| 50 | WORM SHAFT |
| 51 | WORM SHAFT BUSHING |
| 52 | WORM SHAFT RETAINER |
| 53 | WORM SHAFT NUT |
| 54 | PAWL RETAINER |
| 55 | PAWL |
| 56 | PAWL RETAINER SCREW |
| 56a | PUSH WASHER |
| 56b | PAWL RETAINER GUIDE |
| 58 | AXLE |
| 60 | COMPRESSION SPRING |
| 62 | SPOOL |
| 64 | SPOOL RETAINER STRAP |
| 64a | CABLE GUIDE |
| 66 | WORM SHAFT BRACKET |
| 68 | BRACKET MOUNTING SCREWS |
| 70 | BOTTOM MOUNTING PLATE |

DETAILED DESCRIPTION OF PREFERRED EMBODIMENT

Figure 1:
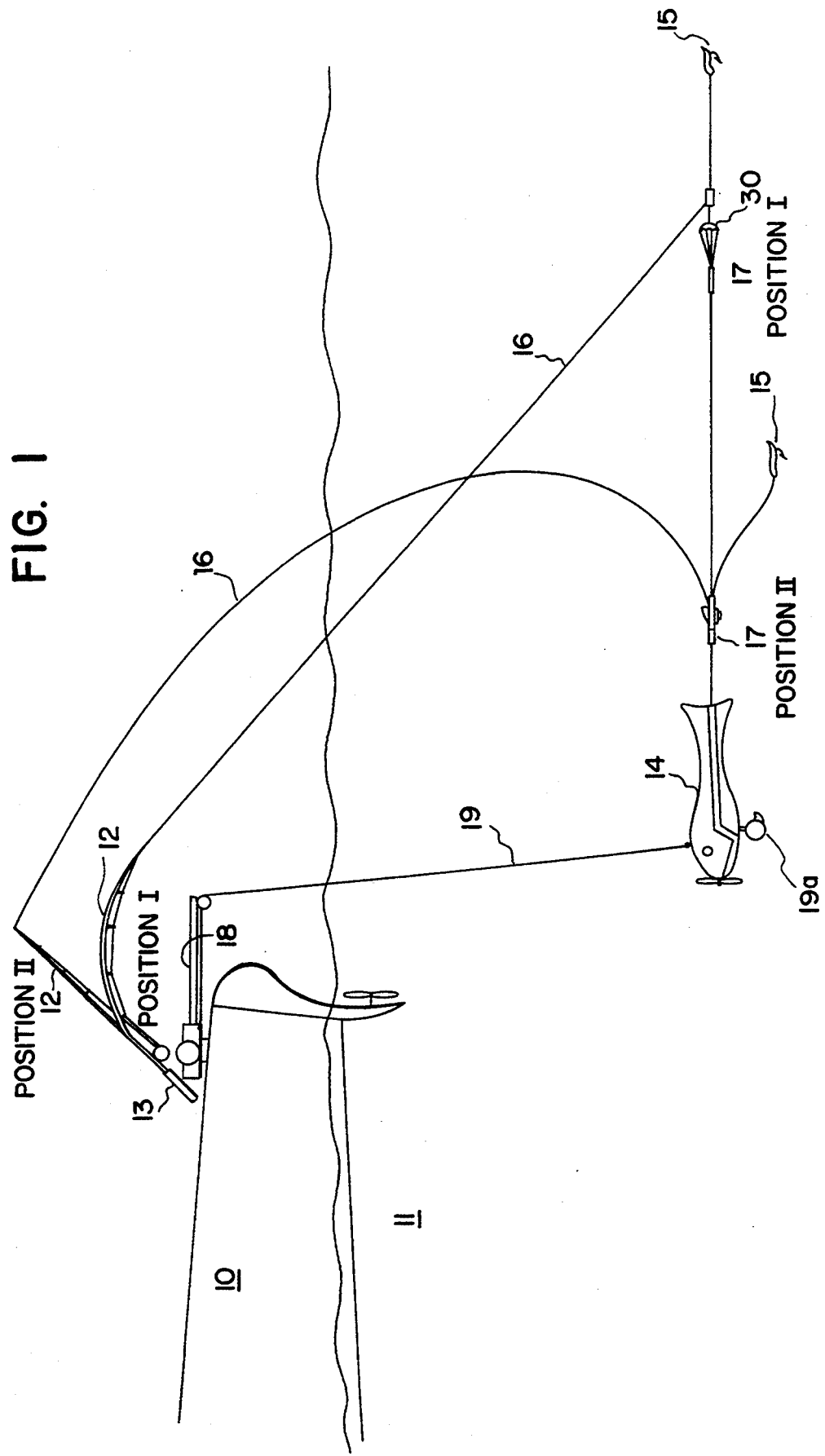
FIG. 1 is a diagram of a side view of the present invention being used as towed by a boat with a downrigger with a fishing rod and line connected to the invention in typical fashion.

Referring to FIG. 1 there is a boat 10 on a body of water 11 with a fish pole 12 mounted in a rod holder 13 with a fishline 16 extending underwater to a new device 14 capable of imitating a fish and capable of imparting an apparent stunned and eratic motion to a lure 15 on the fishing line 16 which is attached to a parachute 17 type drag. The device 14 is suspended from a downrigger 18 and a downrigger cable 19 with a lead weight 19a attached to the bottom of the device 14.

FIG. 1 shows the device 14 working in two different positions. Position I is with the cable 27 fully extended and the lure 15 trolling as it normally would in a typical downrigger type fishing arrangement. As the device 14 retracts the cable 27 towards position II the line 16 and hence the lure 15 accelerates thus representing a darting baitfish. Also the fishing rod 12 is relaxed as tension on the fishing line 16 decreases because it is being pulled closer to the boat 10. As the cable 27 exerts additional force on the parachute drag 17 the mechanism within the drag 17 allows the parachute 30 to collapse thus creating less drag and making it easier to retract cable 27, fishing line 16 and lure 15. In position II the cable 27 is fully retracted and about to be released. Upon releasing, the force on the cable 27 made during retraction, is relaxed and the parachute 30 once again becomes fully open catching the maximum amount of water. The drag 17 is held motionless as the device 14 moves forward until the cable 27 is completely extended. While the parachute 17 is motionless the attached lure 15 is motionless and either sinking, suspended neutral or floating up depending on the type of lure.

A fish witnessing such a scene perceives the device as another fish cruising the area and feeding. The lateral line is used by fish to stun their prey. The lure that is floating of fluttering down appears to have been stunned. When a fish stuns its prey in such a manner it does so by passing its lateral line very close to the prey as it swims by it. It swims by and turns to see if the prey is fluttering, and thus the real thing, and strikes; or it may strike another similar prey in the close proximity. The witnessing fish, which is the anglers prey, hopefully will strike this fluttering lure.

Targeted species desirable to anglers such as salmon, trout, and walleye in freshwater and tuna, sailfish and marlin in saltwater are known to follow bait or lures for some distances prior to striking. A fish following a lure attached to this device will not follow after the first "jig" or release of the cable because it would bump into the lure. This intimidates a fish and will make it strike from natural aggression.

The device is capable of being adjusted as to the frequency of the "jig" and the length of the "jig" with interchangeable parts. In different fishing speeds such as real slow for walleye or real fast for tuna this is valuable to the angler and makes the device more versatile and marketable.

Figure 2:
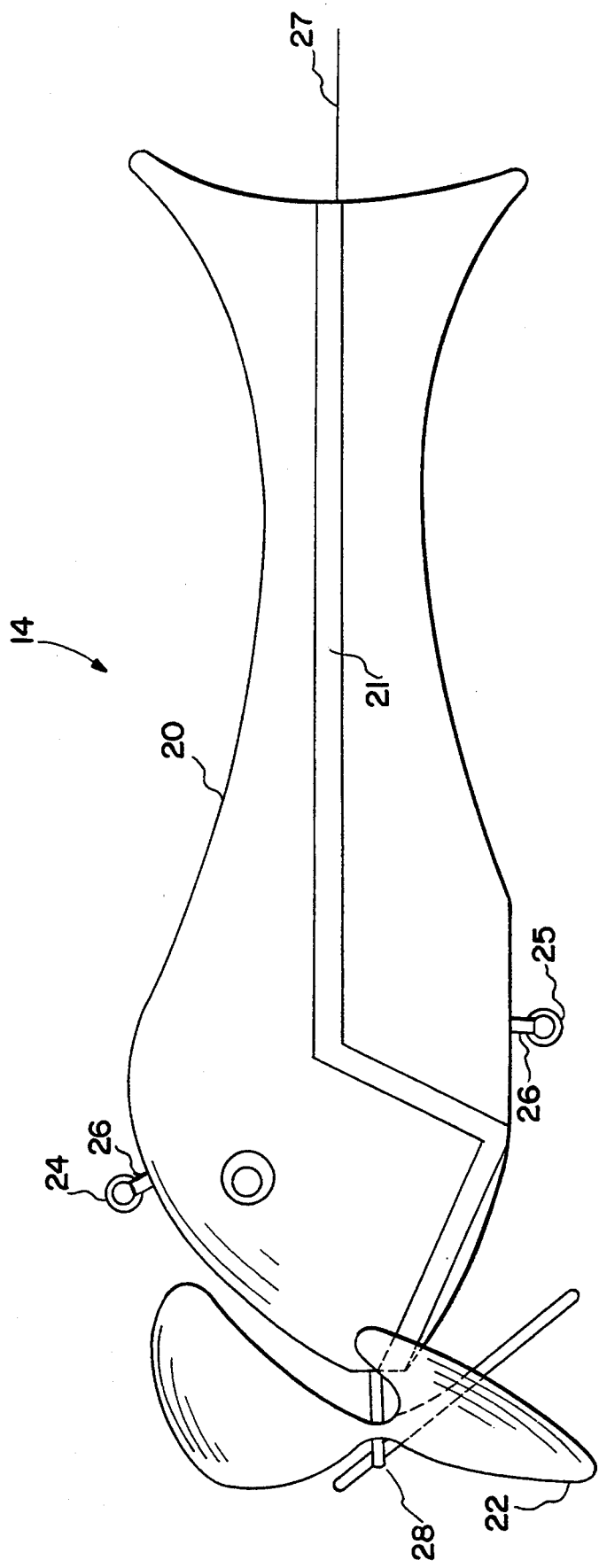
FIG. 2 is a side view of the invention.

In FIG. 2 a side view of the device, shows the design intended to decoy fish into feeding. The device 14 has a prominent reflective line 21 imitating the lateral line of gamefish an eye 23 and the basic fish shape. Propeller 22 attached to shaft 40 and secured by cap nut 28, the propeller is made from a clear polycarbonate material so that it is virtually invisable underwater. Stainless steel studs 24 and ring 26 are attached to the top of the device to use in securing a downrigger cable and stainless steel stud 25 and ring 26 are used to attach a lead weight of the conventional type used in typical downrigger fishing.

Figure 3A:
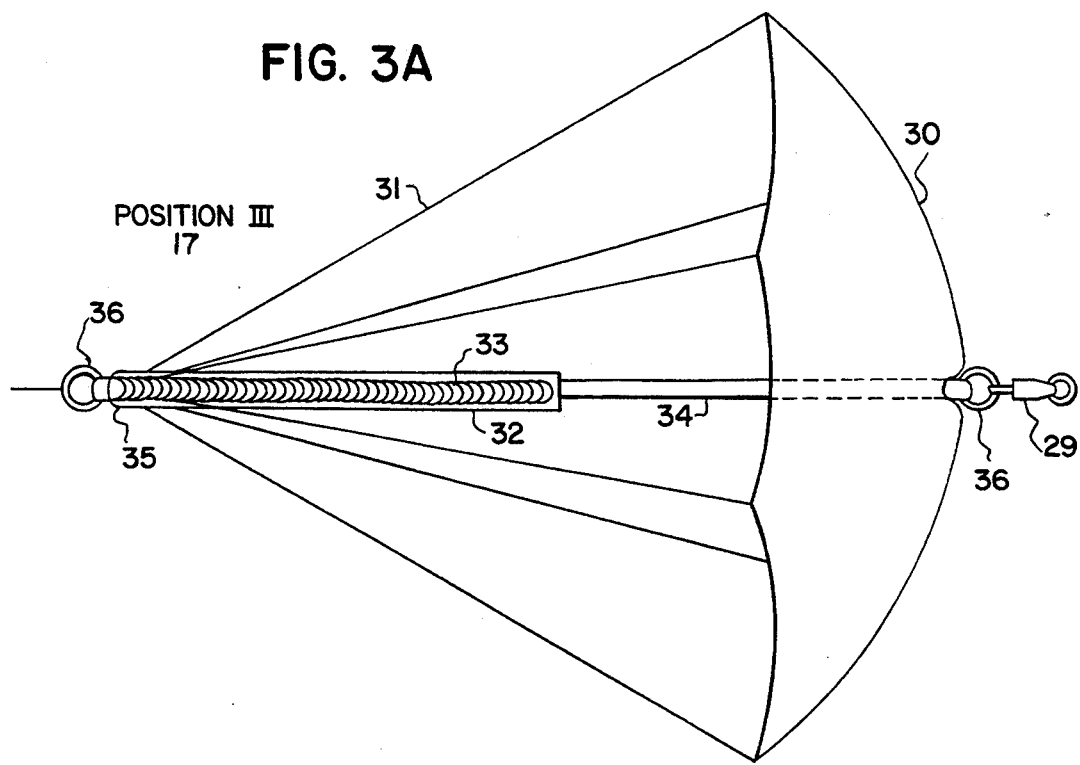
FIG. 3 (FIGS. 3A–3B) is a two position view of the parachute drag of the invention. Position I is with the parachute fully deployed and position II is with the parachute fully collapsed.
Figure 3B:
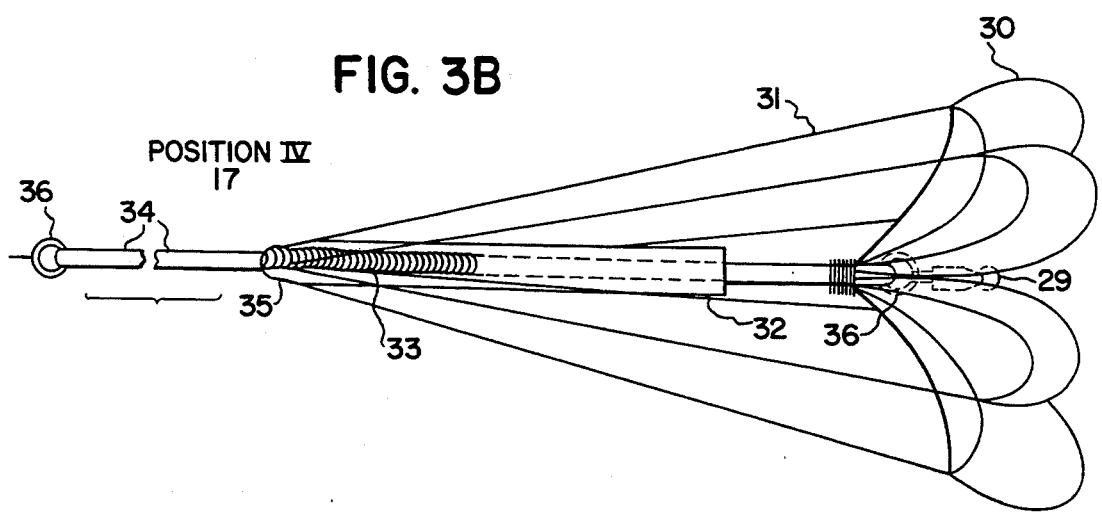

FIG. 3 shows the two functional positions of the parachute type drag 17 attached to the jigging cable 27 and a swivel 29 to which the angler attaches his release and fish line. In the first position the parachute is fully opened and captures the most water thereby causing the most resistance as it moves through the water. The focal point of the resistance is at the restricted end 35 of tube 32 where it is in contact with compression spring 33. Compression spring 33 is attached to rod 34 at its midpoint. The parachute 30 is also connected to rod 34 at the end where swivel 29 is attached by ring 36. When enough force is created by the water on the parachute 30 to force tube 32 to compress spring 33, tube 32 travels rearward along rod 34 allowing strings 31 to let the leading edge of parachute 30 to drop back relative to its attached point on rod 34. The result is a collapse of the parachute 30.

In position IV of FIG. 3 a collapsed parachute 30 is demonstrated. Tube 32 has fully compressed spring 33 with its restricted end 35, strings 31 have allowed the leading edge of parachute 30 to drop back relative to the attached point on rod 34 thus significantly reducing the force applied to this limited area. The significance of this variable force drag in application is that it allows the angler to effectively use the device in a number of different fishing situations. For example, an ocean fisherman trolling for gamefish such as sailfish, troll at relative fast speed, say 6 knots. At this speed the parachute drag will be collapsed at all times as the force on the compression spring will be of considerable energy and the force on the cable caused by the fishline and large ocean lure is enough to quickly release the cable. An angler trolling in the great lakes for salmon and trout troll at an average speed of 2-3 knots. At this speed the parachute drag will be fully open while the cable is releasing and fully collapsed while the cable is being retracted. An angler fishing very slow such as drift fishing for walleye, will be moving less than 1 knot. At this speed the parachute drag will be opened at all times. This variable parachute drag is the result of over two years of testing in as many different conditions that could be found. Nearly 24 different prototypes were tested both in the field and in a controlled test tank. Metal parts are stainless steel, the parachute itself is made from ripstop nylon and the cords are nylon. This durable and effective device is an integral part of the jigging device and will provide the user with dependable and consistent service.

Figure 4:
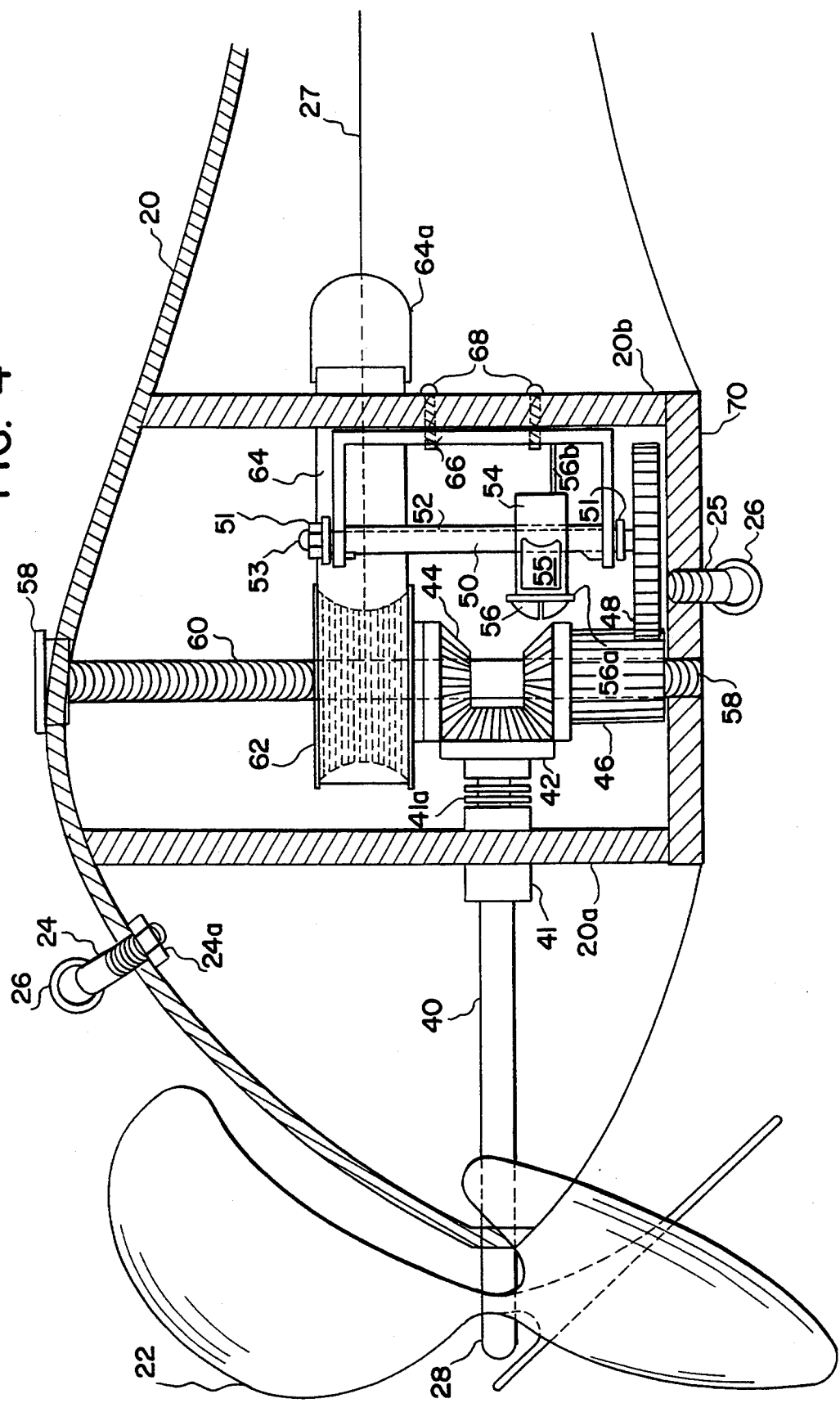
FIG. 4 is a sectional view of the main working parts of the invention in such a position to show the parts as the device retracts the cable.
Figure 5:
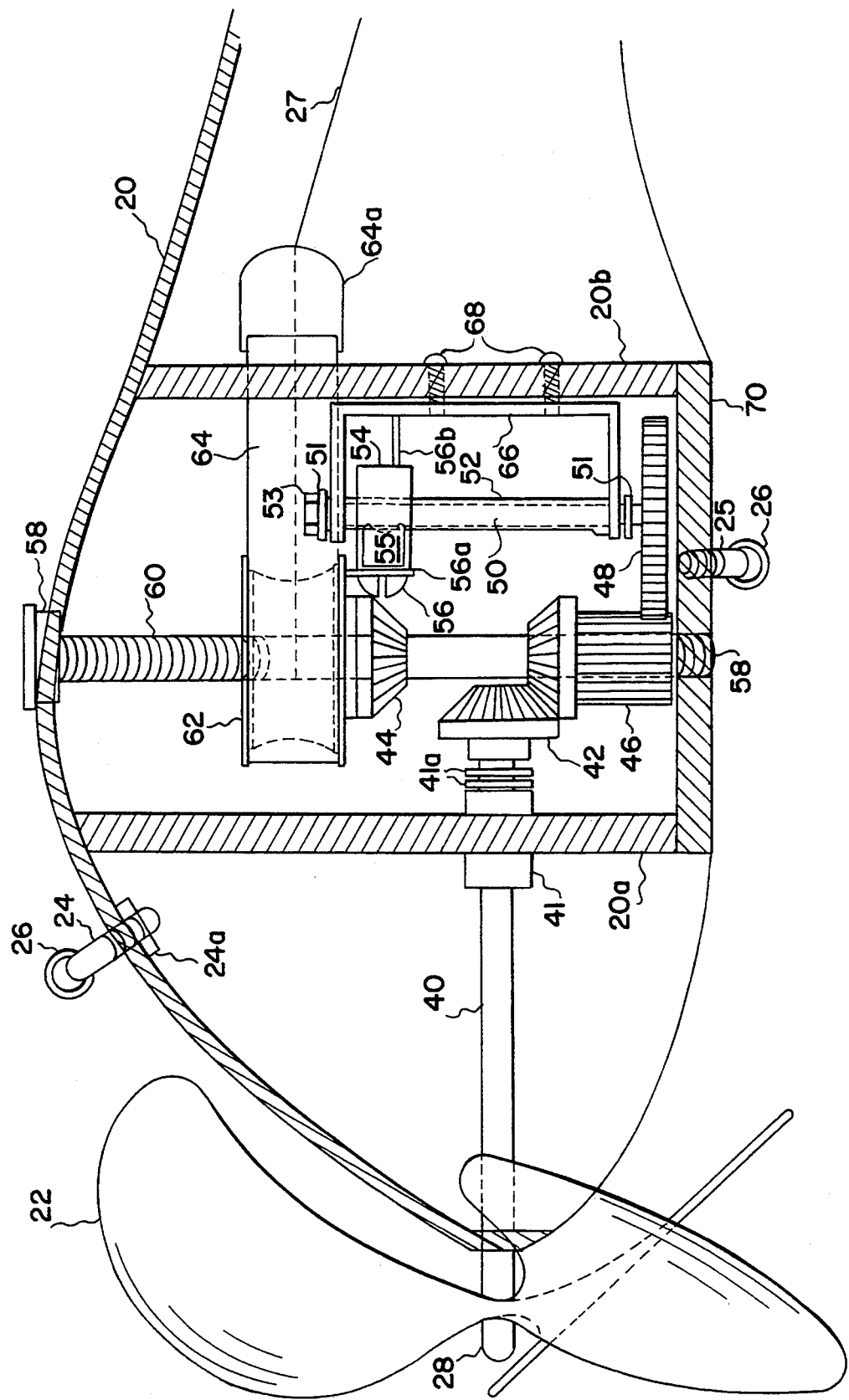
FIG. 5 is a sectional view of the main working parts of the invention in such a position to show the parts as the device releases the cable.
Figure 6A:
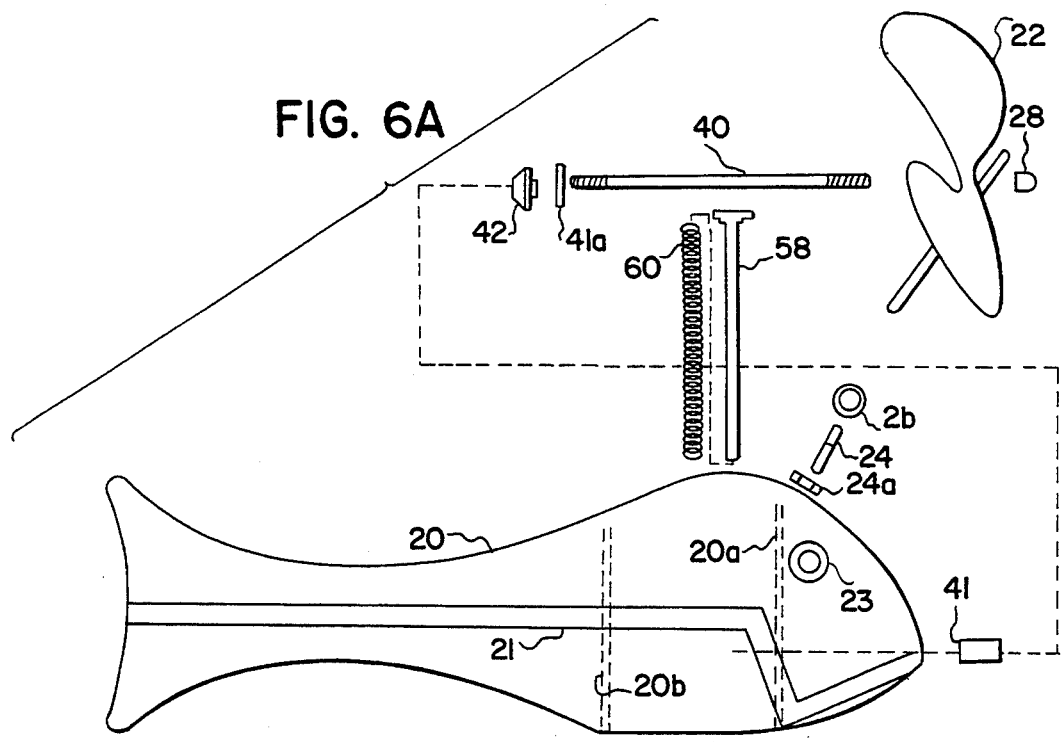
FIG. 6 is a view of the exploded parts of the invention.
Figure 6B:
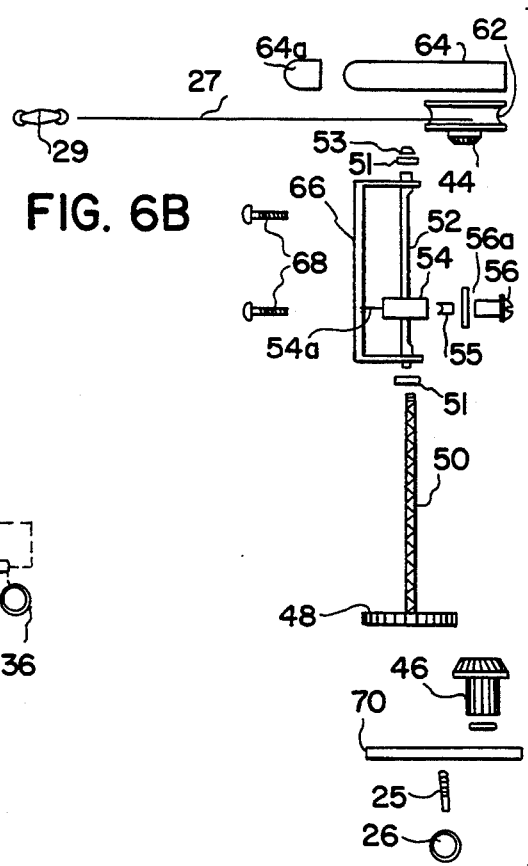
Figure 6C:
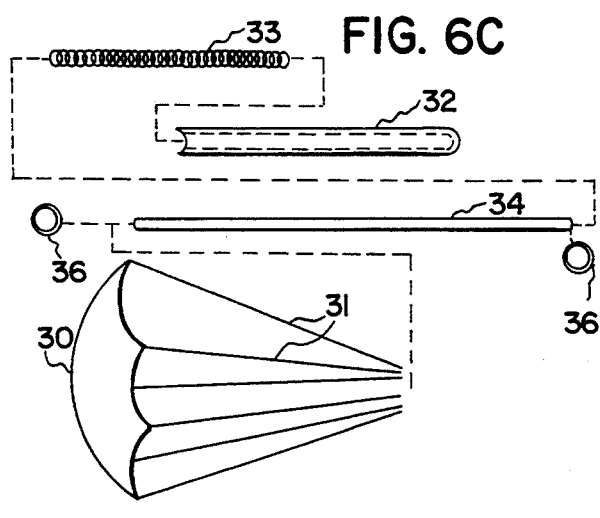
Figure 7A:
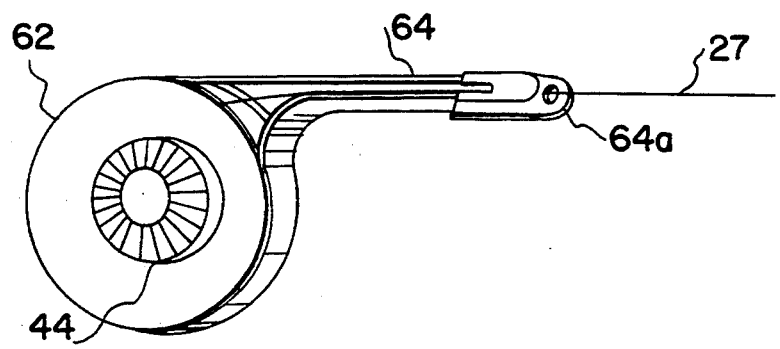
FIG. 7 (FIGS. 7A–7E) is a detailed view of the spool, retainer strap and bevel gear.
Figure 7B:
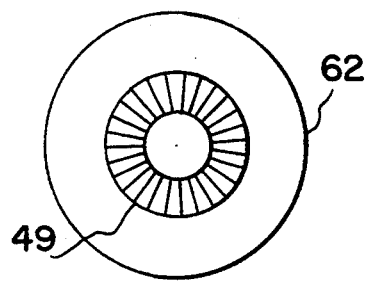
Figure 7C:
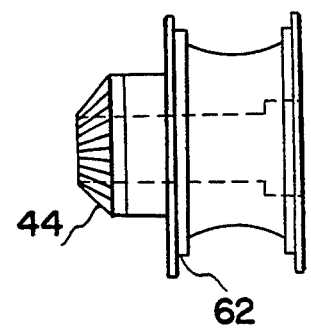
Figure 7D:
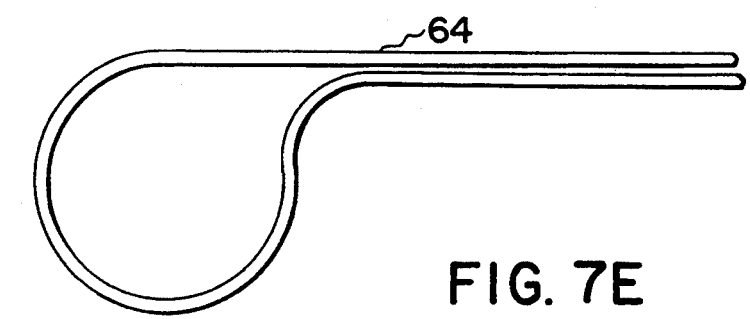
Figure 7E:
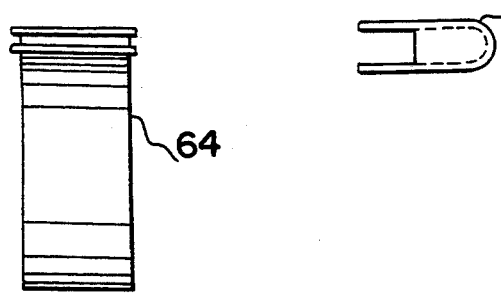

FIGS. 4 and 5 show detailed sectional views of device 14. FIG. 4 is demonstrating the housing 20 positioned as it would while cable 27 is being retrieved. Propeller 22 is driven by the force of water against it and is secured to shaft 40 by cap nut 28. As shaft 40 turns likewise turning beveled gear 42 and being held centered by inside wall 20a, which is part of housing 20 and by bushing 41 and properly aligned by washers 41a. Bevel gear 42 meshes with the bevel gear 44 on spool 62 and with the bevel/pinion gear 46. When bevel gear 42 rotates in its normal counter clockwise direction as seen looking at its face it turns bevel gear 44 in a clockwise direction and bevel/pinion gear 46 in a clockwise direction. As bevel gear 44 and bevel/pinion on gear 46 are facing each other they are actually turning in opposite directions. Bevel gear 44 mounted on spool 62 and bevel/pinion gear 46 are both rotatably mounted on axle 58. Axle 58 is inserted through the top of housing 20 and threads into plate 70. Also installed over axle 58 is compression spring 60. This system of installing the axle through the top of the housing with the compression spring already on and passing through the spool and bevel/pinion gear and threading into the bottom plate is a very efficient and easy method by which the user is able to clean and interchange parts. Also in FIG. 4 as bevel gear 44 turns it turns spool 62. The turning spool 62 has cable 27 attached to its center hub. This center hub has a radius that is concave forcing cable 27 to begin wrapping around the center and then forcing its way to the outer sides as it becomes fuller. This is important as is keeps the cable from being piled too high on one side and binding. Also on spool 62 is located strap 64. Strap 64 wraps around the outside edge of the spool and rides on a shoulder just inside the outer most circumference of the spool. This strap continues rearward in housing 20 and travels along inside wall 20b and as spool 62 moves along axle 58 the strap is moving with it. The spool rotates freely inside this strap allowing cable 27 to wind around spool 62 and during the unwinding the cable 27 can not jump off the spool.

At the end portion of the strap 64 that extends rearward, is a nylon guide 64a with a hole allowing cable 27 to pass through and directing it toward the rear of housing 20.

Bracket 66 is mounted to housing 20 on inside wall 20b by screws 68. Bracket 66 serves to hold worm shaft retainer 52 and a slot in bracket 66 receives guide 56b from the bottom of pawl retainer 54. Bevel/pinion gear 46 drives spur gear 48. Spur gear 48 is attached to worm shaft 50. Worm shaft 50 drives pawl 55 along its axis. Pawl 55 is retained in pawl retainer 54 and is further held in place by cap screw 56. Cap screw 56 holds push washer 56a in place. Also, it is this push washer that contacts spool 62. As pawl retainer 54 moves along worm shaft retainer 52 it engages spool 62 on the spools outside face at the point of push washer 56a. When spool 62 is disengaged its bevel gear 44 is disengaged from bevel gear 42 and it is now able to spin freely on shaft 58.

The drag being placed on cable 27 causes the spool to freewheel thus unwinding the cable. The pawl retainer 54 continues to the top Of worm shaft retainer 52 nearly touching the top of bracket 66 and then begins descending along the worm shaft retainer until it reaches the bottom of bracket 66 and continues to follow this up and down motion as long as spur gear 48 is driving worm shaft 50.

FIG. 4 shows a position when pawl retainer is not touching spool 62, spool 62 is fully engaged with bevel gear 42 and would be retrieving cable 27 as propeller 22 drives the mechanism.

FIG. 5 shows pawl retainer 54 having pushed spool 62 away from bevel gear 42 and cable 27 would be unwinding by force from cable 27. FIG. 5 also shows compression spring 60 fully compressed and forcing spool 62 back towards bevel gear 42 as pawl retainer 54 allows spool 62 to descend along shaft 58.

FIGS. 4 and 5 also show stud 24 with ring 26 held in place by nut 24a and threaded through housing 20. Stud 25 is threaded into plate 70 with ring 26 attached. These studs and rings are for attaching the device 14 to a cable and to hang a conventional weight on.

Housing 20 and propeller 22 are made from a polycarbonate material and thus light weight and durable. The propeller is usually used clear so as to be less visable in the water, but may also have reflectors attached to act as an attracant. The bevel and spur gears are nylon, the axle and propeller shaft are stainless steel and the worm shaft, worm shaft retainer pawl and pawl retainer are the parts of a typical level wind reel used to evenly stack the line on a conventional fishing reel spool. The bracket holding this assembly is stainless steel as are the screws attaching it to the housing. The spool is nylon or polycarbonate and the strap retaining the teflon coated dacron cable is nylon. This device is the result of four years of design,developing and testing of 16 different prototypes with many variations in each. The exhaustive effort in developing this product consumed thousands of hours and tens of thousands of dollars. Every part and every material used were tested to provide the least costly and most dependable. Extensive field testing by a variety of professional and amateur anglers provide a wide range of opinions and the resulting device is the product of the best of these ideas. During development when the patent search was completed prototypes and methods that had been eliminated as not the most efficient were discovered in the prior art. References to dimensions, pitches, tolerances and the like have been avoided in this description because they will serve to limit reader understanding as most parts can be changed to effect different performance as outlined elsewhere. Specific changes that may become common include changing spool 62 to a spool with a smaller or larger radius in its hub, allowing for more or less cable to be wound with each revolution and relocating bracket 66 and consequently the worm drive higher on inside wall 20b thus changing the amount of revolutions, spool 62 is engaged with bevel gear 42. Propeller 22 would make the device operate slower or faster with more or less pitch. The relative light weight of the unit allows the user to suspend a weight of their preference at stud 25 and thus control the angle or attitude the device moves through the water. As presented the overall length of the device is 16", the width is 2", and the height at the axle is 5". The parachute drag is 6" long with a 5" diameter parachute.

Thus, if the attempt to make this device understandable and clear to the reader has been accomplished it's versatility and dependability, and hence the anticipated demand, will be obvious. Using the latest knowledge known as to the habits and instincts of game fish and using the most advanced and dependable materials available the device will provide the angler with more fish thus encouraging the conservation of them and with more satisfaction thus encouraging participation at all levels of skill and interest.

This particular preferred embodiment of the invention has been shown and described and it will be obvious to those skilled in the art that changes and modifications may be made without departing from the invention and therefore, the aim of the claim is to cover all such changes and modifications that fall within the true scope and spirit of this invention.

I claim:

1. An improved underwater, waterpowered device, which enhances the lifelike action of various artificial lures by imparting an erratic motion to the lure through a means of changing the relative speed and motion of said lure attached to a fishing line wherein the improvements comprise a housing with means by which it is attached to a boat or a cable from a boat or a float towed behind a boat, and a propeller attached to one end of a shaft and inserted into the front of said housing with a bevel gear attached to the opposite end of said shaft that will turn with said shaft and said propeller and an axle passing from top to bottom of said housing perpendicular to said propeller shaft on which is rotatably mounted a bevel geared spool and a bevel/spur gear, both of which mesh with the bevel gear on the propeller shaft and turn in opposite directions when driven by said propeller, propeller shaft and bevel gear a spur gear mounted on a worm shaft, the spur gear driven by said bevel/spur gear causing the worm shaft to rotate with said spur gear causing a pawl in a pawl retainer to travel along a continuous helix groove in the worm shaft from one end of the worm shaft and returning to the opposite end of the work shaft and continuing this motion as long as said worm shaft is turning and means to mount said worm shaft so that the worm shaft is parallel to said axle and as said pawl and pawl retainer travel along the wormshaft they come in contact with the bevel geared spool causing the spool to travel along said axle and disengage from said bevel gear on said propeller shaft and a compression spring mounted on said axle with one end contacting said bevel geared spool and the opposite end contacting said housing top, the compressed force of the compression spring, engaging said bevel geared spool to said bevel gear on said propeller shaft and a cable attached to the inner radius of said spool a strap around the outer edge of the spool extending towards the rear of said housing and said cable passing through the end of said strap and continuing to the rear of said housing, said cable extending out of said housing Whereby a fish witnessing such device and such change in motion of a lure is instinctively decoyed into joining the apparent feeding activity and upon striking the lure the line is detached and the angler plays the fish.

2. An improved underwater, waterpowered device as set forth in claim 1 including a spring loaded parachute device serving as a drag attached to the said cable of said device comprising a rod attached to the center of a parachute with a ring attached to both ends of said rod by which a cable is releaseably attached to one end and a swivel is attached to the opposite end which is attached to the parachute and tube restricted at one end so that said rod passes through but holding a compression spring back thereby allowing said spring to compress as said rod passes through said tube with strings attached to said tube at the restricted end and attached to said parachute at evenly spaced intervals along the outside edge of said parachute so as said tube moves forward and backward on said rod assisted by said compression spring and by force on said parachute said strings will likewise move forward and backward allowing said parachute to expand or collapse in relationship to the attached point on said rod whereby the force or drag caused on said cable attached to said parachute type device will vary with the expansion or collapse of the parachute.

3. An improved underwater, waterpowered device as set forth in claim 1 including the spool for retrieving a cable, said spool comprising a bevel gear protruding from one side of said spool and a recessed shoulder on the opposite side of said spool to retain one end of a compression spring while allowing an axle to pass through the compression spring, and through a bore centered in said spool, and through the center of said bevel gear allowing said spool to rotate on said axle and a strap encircling the outer most edge of said spool and fitted into a shoulder on the outer most edge so that the spool may spin freely inside said strap where by said strap acts as a retainer holding a line that winds on the inner hub of said spool and not allowing the line to pass over the outer most edge of said spool and a radius on the inner hub of the spool with a concave profile to force an even wrapping of a line connected to the center of the inner hub.

4. A device as set forth in claim 1 wherein the overall shape of said housing is a molded housing resembling a fish and having a prominent lateral line with fins, gills, eyes, a mouth and similar fish details to make it resemble a fish.

* * * * *